Oct. 27, 1953 J. B. RETALLACK 2,657,268

SYSTEM FOR AUTOMATICALLY TICKETING TELEPHONE CALLS

Filed Oct. 14, 1948 8 Sheets-Sheet 1

INVENTOR
J. B. RETALLACK
BY P. C. Smith
ATTORNEY

SYSTEM FOR AUTOMATICALLY TICKETING TELEPHONE CALLS

Filed Oct. 14, 1948 8 Sheets-Sheet 2

INVENTOR
J. B. RETALLACK
BY P. C. Smith
ATTORNEY

SYSTEM FOR AUTOMATICALLY TICKETING TELEPHONE CALLS

Filed Oct. 14, 1948 8 Sheets-Sheet 3

INVENTOR
J. B. RETALLACK
BY *P. C. Smith*
ATTORNEY

SYSTEM FOR AUTOMATICALLY TICKETING TELEPHONE CALLS

Filed Oct. 14, 1948 8 Sheets-Sheet 4

INVENTOR
J. B. RETALLACK
BY P. C. Smith
ATTORNEY

Oct. 27, 1953 J. B. RETALLACK 2,657,268

SYSTEM FOR AUTOMATICALLY TICKETING TELEPHONE CALLS

Filed Oct. 14, 1948 8 Sheets-Sheet 5

INVENTOR
J. B. RETALLACK
BY P. C. Smith
ATTORNEY

Oct. 27, 1953 J. B. RETALLACK 2,657,268

SYSTEM FOR AUTOMATICALLY TICKETING TELEPHONE CALLS

Filed Oct. 14, 1948 8 Sheets-Sheet 6

INVENTOR
J. B. RETALLACK
BY P. C. Smith
ATTORNEY

Oct. 27, 1953 J. B. RETALLACK 2,657,268

SYSTEM FOR AUTOMATICALLY TICKETING TELEPHONE CALLS

Filed Oct. 14, 1948 8 Sheets-Sheet 7

INVENTOR
J. B. RETALLACK
BY
P. C. Smith
ATTORNEY

Oct. 27, 1953 J. B. RETALLACK 2,657,268

SYSTEM FOR AUTOMATICALLY TICKETING TELEPHONE CALLS

Filed Oct. 14, 1948 8 Sheets-Sheet 8

INVENTOR
J. B. RETALLACK
BY P. C. Smith
ATTORNEY

Patented Oct. 27, 1953 2,657,268

UNITED STATES PATENT OFFICE 2,657,268

SYSTEM FOR AUTOMATICALLY TICKETING TELEPHONE CALLS

John B. Retallack, New York, N. Y., assignor to Bell Telephone Laboratories, Incorporated, New York, N. Y., a corporation of New York Application October 14, 1948, Serial No. 54,559

13 Claims. (Cl. 179—7.1)

This invention relates to automatic telephone systems in general and in particular to automatic systems wherein automatic toll ticketing is provided.

In Patent 2,629,016 of February 17, 1953, to J. W. Gooderham is disclosed and claimed an automatic telephone system wherein a ticketing trunk is selected and used to complete a call made by a calling subscriber to a called location which is in an area requiring the calling subscriber to be charged and ticketed for a toll call. In the Gooderham patent, the disclosure of which is, by example, of a step-by-step automatic ticketing system, the ticketing trunk has permanently associated therewith a ticket printer controlled by a printer control circuit, forming a part of the central office sender, to effect the printing of a toll ticket by a ticket printer.

In Patent 2,520,962 to J. B. Retallack of September 5, 1950 is disclosed a cross bar type automatic system wherein a ticketing trunk is used to complete a toll call. In that Retallack patent a printer control circuit separate from the sender is used to control the ticket printer and is one of a plurality of such circuits from which any idle one may be selected and used in connection with any ticketing trunk independently of the sender employed. The Retallack patent above referred to discloses an invention which is similar to the present invention but is specifically arranged for operation in a cross bar system.

The main object of the present invention is to improve automatic ticketing arrangements in general and in particular to provide more flexibility and economy in the use of printer control circuits.

It is a further object of the present invention to provide a plurality of printer control circuits common to a group of ticketing trunks whereby any such control circuit may be associated with any trunk for ticket printer control purposes and thus reduce the number of such control circuits required to serve said group of trunks.

A further object of the present invention is to provide means for obtaining the called code and directory numbers from a panel type sender with a minimum of modification of presently existing senders.

In accordance with the present invention, an automatic ticketing system is arranged in which a plurality of printer control circuits is provided, an idle one of which circuits is associable with a sender and with a ticketing trunk seized under control of common control equipment responsive to digits of the called subscriber's number registered in the sender. The common control equipment causes the interconnection of the sender and trunk with the printer control circuit thereby extending control leads between the control circuit and the associated sender and trunk. The called number registrations, for instance, are transferred from the sender registers to the control circuit registers over some of said contol leads. Others of said leads enable said control circuit to control the ticket printer of the trunk in accordance with the control circuit registrations.

The invention, as described herein, further provides for association of an identifier with the trunk and printer control circuit whereby said identifier may identify equipment used in establishing the connection and transfer any such information as may be required to the printer control circuit, from which circuit such information is transferable to the ticket printer of the trunk under control of said printer control circuit.

More specifically, the present invention, according to the embodiment disclosed and described herein, provides for selection of an idle ticketing trunk under the control of a sender in response to the called line digits dialed by the calling subscriber. Upon selection of a trunk a trunk finder is started to find the selected trunk. The trunk finder connects the trunk to an identifier preference relay chain and an idle identifier is associated with the trunk and the sender by means of the trunk finder. The identifier makes an identification of the sender and operates the corresponding select magnet on a sender-printer control link switch. The identifier effects operation of the select magnet on the trunk-printer control link switch corresponding to the selected trunk. The identifier also operates a hold magnet on each switch corresponding to one of the printer control circuits to thereby interconnect the sender to the printer control circuit and the latter to the trunk. Sender and identifier circuits transmit information pertaining to the call to registers in the control circuit and the latter controls the ticket printer of the trunk to print a toll ticket containing such information. The control circuit associates itself with an idle month, day and hour circuit and effects the printing of such information on the ticket. When all information, such as calling line number, called line number, sender number, trunk number, identifier number, class of service, month, day and hour of the call, etc., necessary for billing purposes, except length of conversation, has been printed on the ticket, all of the associated apparatus, such as printer control circuit, releases to normal leaving the trunk to control the ticket printer therein to print the elapsed time of conversation under control of trunk supervisory relays.

The invention, outlined above, is disclosed in detail hereinafter as embodied in a panel type automatic ticketing system shown on the drawings which are described generally as follows.

Figures 1, 9:
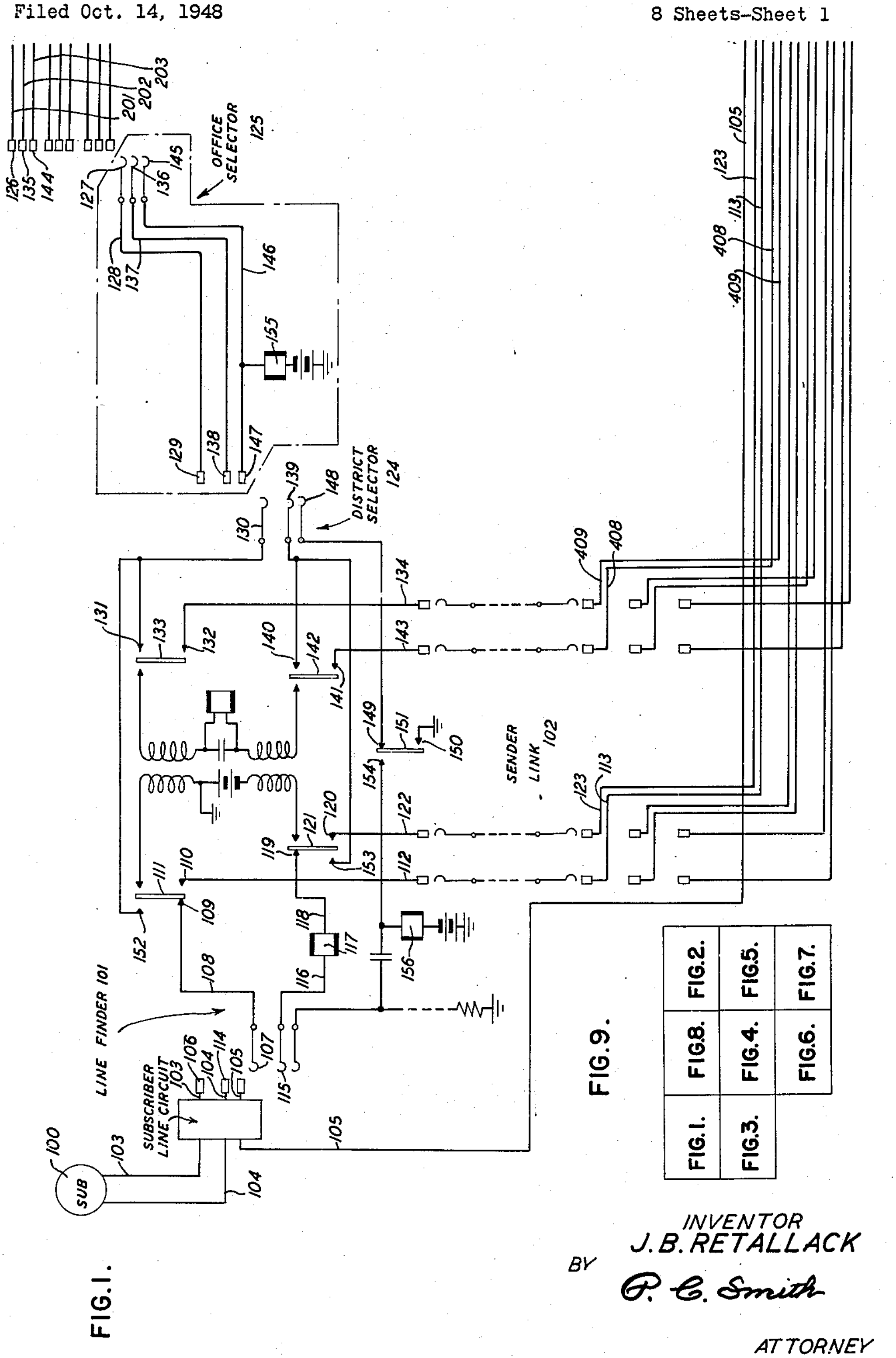
Fig. 1 shows panel selector switches whereby a subscriber's line may be extended through a line finder, sequence switch, district selector, and office selector to a ticketing trunk, and a sender link by means of which a subscriber's line may become associated with an idle sender through the medium of the well-known sequence switch arrangement.
Figure 5:
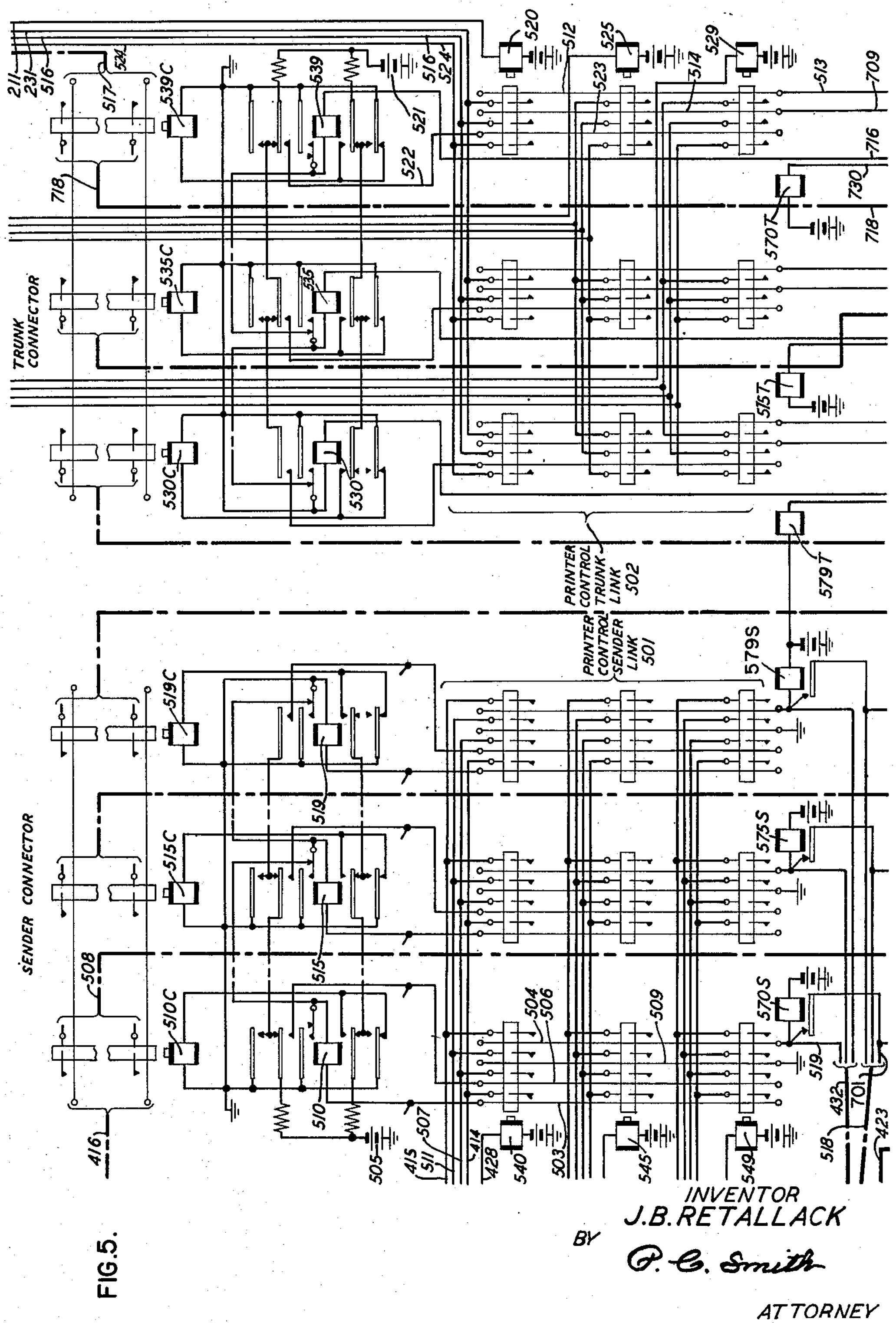
Figure 6:
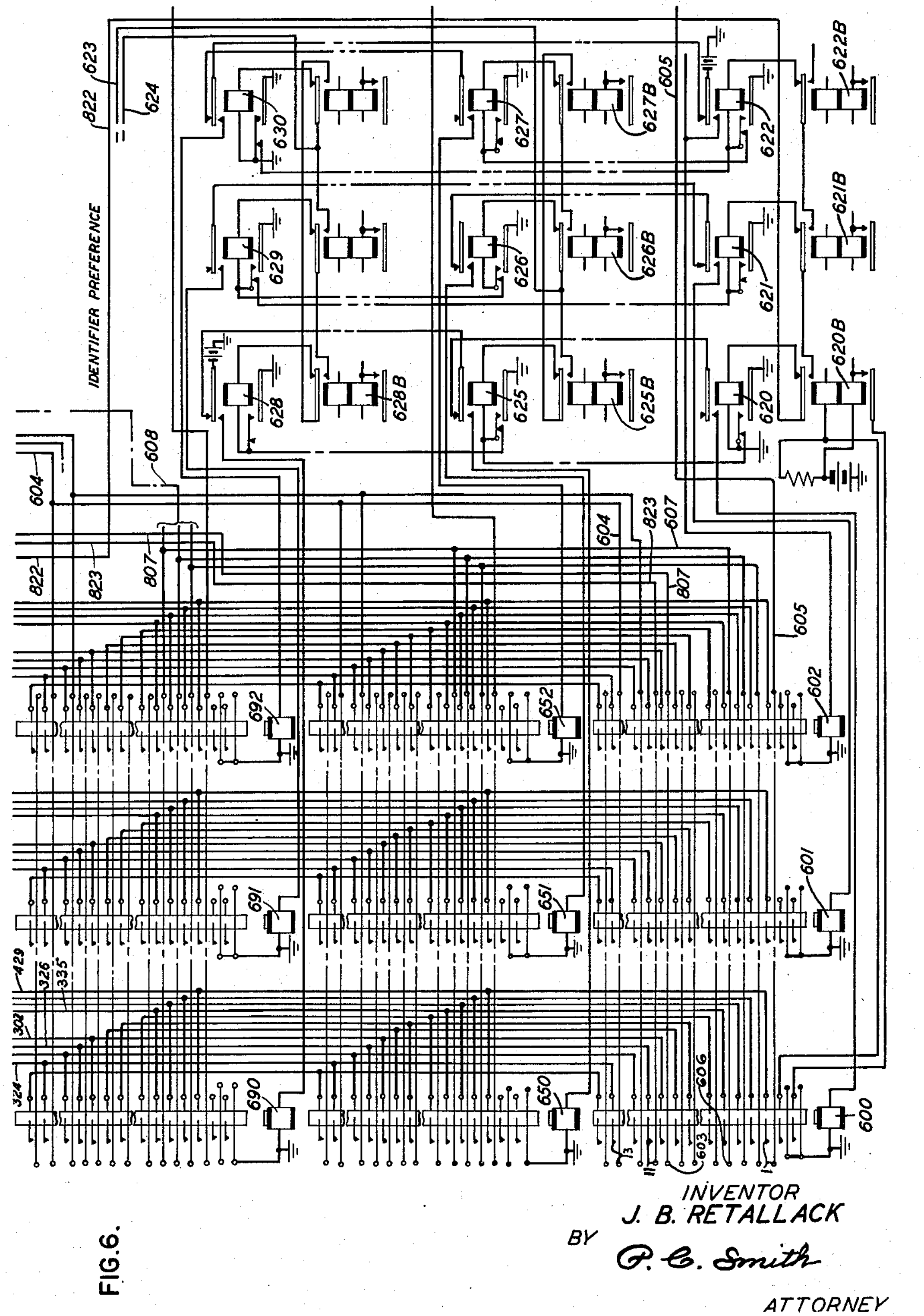
Figure 7:
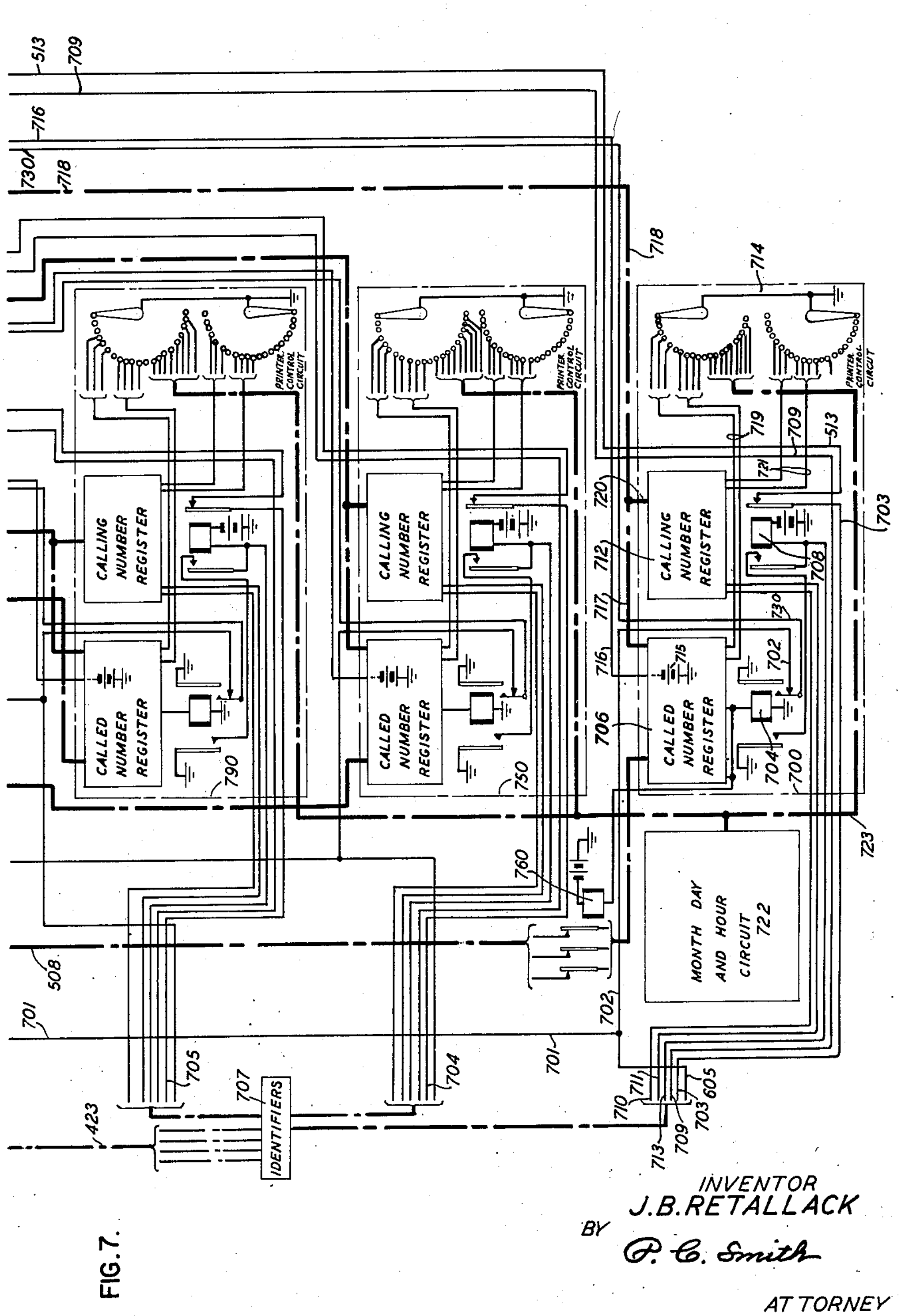
Figure 8:
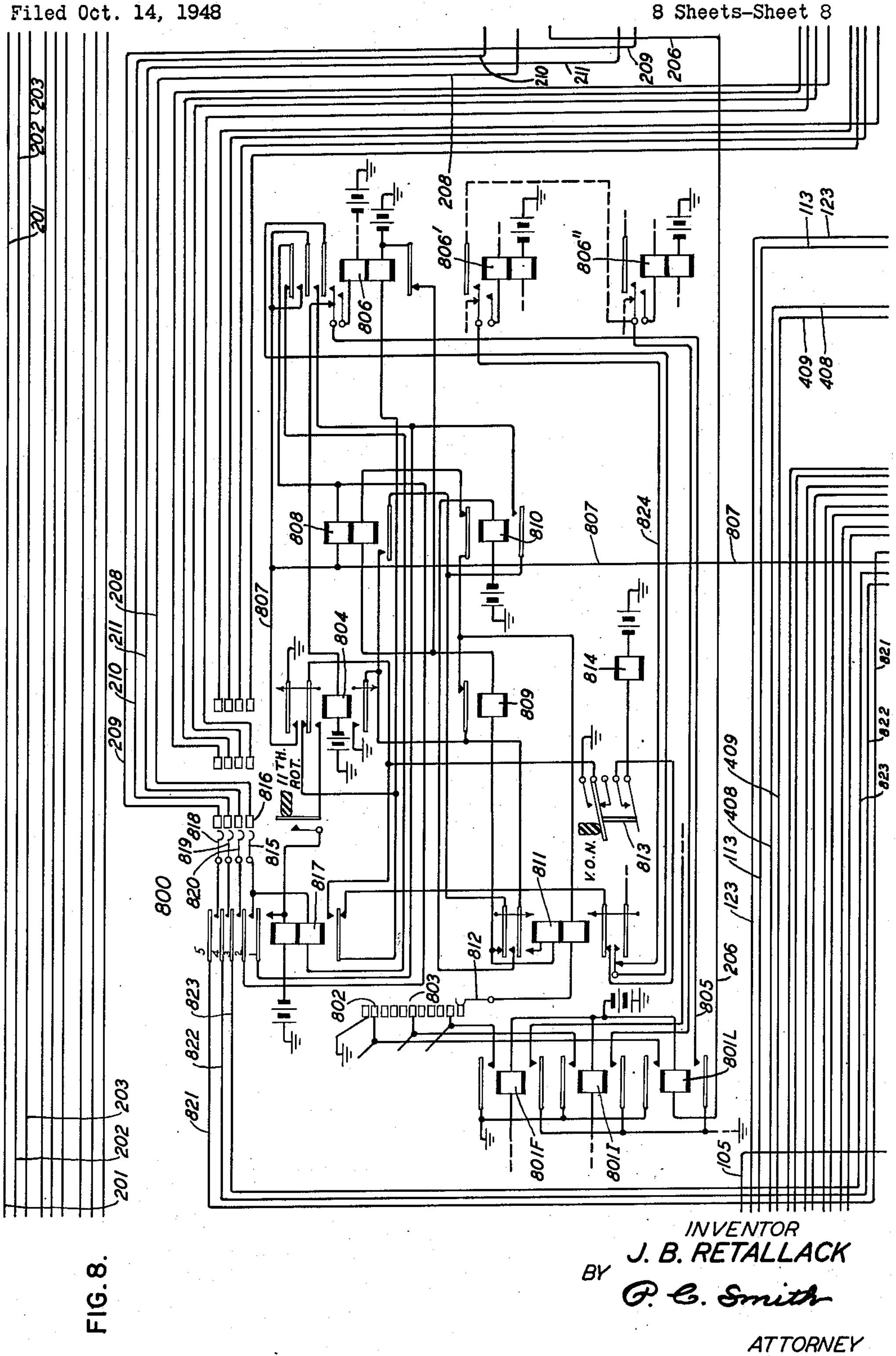

Fig. 5 shows two cross bar switches, one having horizontal appearances terminating in senders, the other having horizontal appearances terminating in senders, the other having horizontal appearances terminating in trunks, and both having a hold magnet of each common to one of a plurality of printer control circuits, each of which control circuits appears on a vertical of each switch so as to be connectable between any selected sender and any selected trunk;

Fig. 6 shows a group of identifier connector relays and identifier preference relay chains for enabling any trunk to call in an idle identifier to be associated with any printer control circuit;

Fig. 7 shows three printer control circuits, representative of a plurality of same, terminating in verticals of a sender-control link switch and of the trunk-control link of Fig. 5, and a group of identifiers used for calling line identification;

Fig. 8 shows a trunk finder arrangement whereby after a trunk is seized a trunk finder operates to associate an idle identifier with the selected trunk;

Fig. 9 illustrates the manner in which Figs. 1 through 8 may be arranged to show as a composite schematic a skeletonized panel type of automatic toll ticketing system embodying the present invention.

Only sufficient disclosure is described hereinafter as is sufficient to make understandable to one skilled in the pertinent art the construction, operation and merit of the present invention. Reference is made to the aforementioned Gooderham patent for more detailed description of the system shown in brief herein and described in connection with the present invention.

*Initiation of a call*

When subscriber 100 initiates a call on his line a line finder 101 is started to hunt for the subscriber's line in the usual manner. Prior to the hunting operation of line finder 101 an idle sender link circuit 102 had been associated with line finder 101 by means of the district selector and its sequence switch arrangement. Thus the line finder 101, at the time it hunts for the calling line, has associated therewith a link whereby an idle sender may be seized immediately upon the line finder's connection with the calling line. Such a link circuit and its operation are fully described in Patent 1,690,206 to A. Raynsford of November 6, 1928, and patents referred to therein.

When line finder 101 finds and makes connection to the tip 103, ring 104 and sleeve 105 of the line circuit of subscriber 100, and when an idle sender 400 has been associated with said line by means of sender link 102, the sequence switch is in such position that the tip conductor 103 is completed in circuit to the dial register 401 of sender 400 over terminals 106 and 107 of line finder 101, conductor 108, contacts 109 and 110 and disc 111 of the sequence switch, conductor 112, over terminals and conductors of sender link 102 and conductor 113 to dial register 401 of sender 400. The ring conductor 104 is likewise completed in circuit to the dial register 401 over terminals 114 and 115 of line finder 101, conductor 116, through the winding of supervisory relay 117, over conductor 118, contacts 119 and 120 and disc 121 of the sequence switch, conductor 122, over terminals and conductors of sender link 102 and conductor 123 to dial register 401 of sender 400.

When sender 400 is selected and seized, off-normal relay 402 is operated to supply ground to its front contacts, which ground connections perform functions to be explained hereinafter. Attendant to the operations comprising the seizure of a sender, dial tone is supplied to the subscriber's line to indicate to such subscriber that the switching equipment at the central office is ready to receive the dial pulses representing the called number. As subscriber 100 dials the digits of the called number such digits are registered on register relays in dial register 401 of sender 400. After the digits representing the office code of the called number (generally referred to as the A, B and C digits, being the first three of the generally known seven-digit system, when the office code requires three digits) have been registered in register 401 and after the sender 400 has directed the district and office selectors to seize a trunk in accordance with the office code digits, a class relay 403 is operated. The operation of class relay 403 completes the operating circuit of relay 404 of sender 400 from ground over the front contact and operated armature of relay 403, the lower back contact and armature of selections beyond relay 405, the winding of relay 404 to ground through battery 406. Relay 404 operates in the latter circuit and in operating prepares over its two armatures two circuit paths to be explained hereinafter. The dotted portions 407 of leads 408 and 409 are completed on ticketed calls after selection of a ticketing trunk.

While the sender 400 is directing the trunk selection, the numericals of the called line number are registered in dial register 401. When the sender 400 has directed the district selector 124 and the office selector 125 to seize the idle trunk of Fig. 2 the tip conductor 108 and ring conductor 116 of the district are still connected to the dial register 401 of sender 400. The tip conductor 201 of the trunk is in circuit over terminals 126 and 127 of the office selector 125, conductor 128, terminals 129 and 130 of the district selector 124, contacts 131 and 132 and disc 133 of the sequence switch, conductor 134, terminals and conductors of sender link 102 and conductor 409 to the upper operated armature of relay 404. The ring conductor 202 of the trunk is in circuit over terminals 135 and 136 of office selector 125, conductor 137, terminals 138 and 139 of district selector 124, contacts 140 and 141 and disc 142 of the sequence switch, conductor 143, terminals and conductors of sender link 102 and conductor 408 to the lower operated armature of relay 404. The sleeve lead 203 of the trunk extends over terminals 144 and 145 of the office selector 125, conductor 146, terminals 147 and 148 of the district selector 124 and to ground over contacts 149 and 150 and disc 151 of the sequence switch. Line relay 155 of the office selector circuit operates to ground over contacts 149 and 150 and disc 151 of the sequence switch and over the sleeve lead.

*Sequence switch operation*

The operation of the sequence switch is well known to those familiar with the panel type automatic telephone system and only sufficient of the operation of such switch as is necessary for an understanding of the present invention is set forth herein. Disc 111 interconnects contacts 109 and 110 during dialing and switches such interconnection to between contacts 109 and 152 by the time for cut-through of the trunk. Likewise disc 121 interconnects contacts 119 and 120 during dialing but switches the connection of contact 119 to contact 153 by the time for trunk cut-through. Disc 133 interconnects contacts 131 and 132 until cut through whereupon this interconnection is opened. Disc 142 performs similarly to disc 133. Disc 151 interconnects contacts 149 and 150 before and up to cut-through and then changes the interconnection to one between contacts 149 and 154.

*Trunk finder operation*

Reference is made to the disclosure of Patent 2,351,551 to C. F. Seibel of June 13, 1944, for a full description of the operation of trunk finders. Only sufficient of the operation thereof is set forth herein as is necessary to a full understanding of the present invention.

Figure 2:
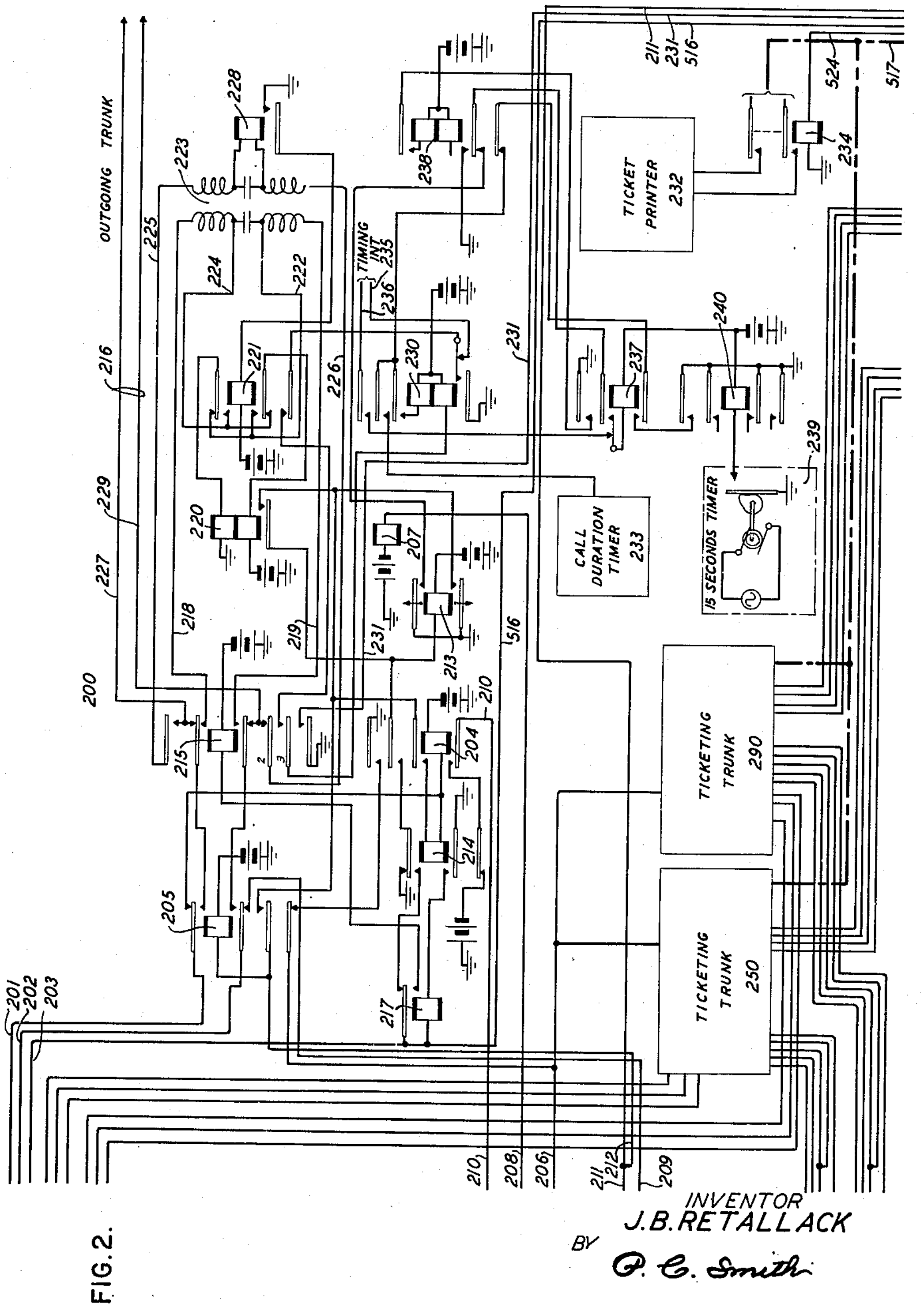
Fig. 2 shows three trunks representative of a group of such trunks, any one of which may be selected, one trunk having been shown in some detail but only to the extent necessary to a full understanding of the present invention, and a ticket printer associated with the detailed trunk circuit.

Upon selection of trunk 200 of Fig. 2 relay 204 is operated in a circuit extending from battery, through the winding of relay 204, over the upper back contact and unoperated armature of the selections beyond relay 205, tip conductor 201 of trunk 200, tip conductor 128 of the office selector 125, contacts 131 and 132 and disc or cam 133 of the sequence switch, conductor 134, contacts and conductors of the sender link 102, conductor 409 of sender 400, to ground over the upper front contact and operated armature of relay 404. Operation of relay 204 places ground on its upper outer front contact, over the lower outer back contact of relay 205 to trunk finder start lead 206 through the winding of group start relay 801L of the trunk finder 800, which relay 801L is allocated to a group of trunks such as 200, 250 and 290 of Fig. 2, all of which trunks have the start lead 206 in common therewith. Other group start relays, such as 801I and 801F may be provided for other groups of trunks. Relay 801L operates in the latter circuit comprising grounded start lead 206.

Group relay 801L, upon operating, connects ground over its upper contacts to the level segment 802 of the vertical commutators 803 of all trunk finders having access to the group of trunks concerned and causes the operation of the start relay 804 of the first idle trunk finder. The trunk finders are divided into preference groups in accordance with the groups of trunks whereby any trunk of a group has preferential use of trunk finders of a particular group. If at any time all of the trunk finders which are the first choice preference of a group of trunks are busy, such group of trunks then has second choice use of the trunk finders of another group which are normally the first choice of another trunk group.

The trunk finder 800 is the first finder of the last group of finders allocated as first choice to the last group of trunks to which the group start relay 801L appertains. It will be assumed that this finder is idle and therefore upon the operation of relay 801L, a circuit is established from ground over the lower contacts of relay 801L, in-start conductor 805, over the inner upper normal contacts of relay 806, through the winding of start relay 804 to battery and ground. Relay 804, upon operating, connects ground over its upper outer contact to conductor 807. It also causes the operation of the stepping relay 808 in a circuit extending from ground over its lower contacts, interrupter contacts of vertical magnet 809, interrupter contacts of rotary magnet 810, the lower winding of relay 808 to battery and ground over the lower back contact of relay 806. Relay 808, upon operating, causes the operation of the vertical stepping magnet 809 over a circuit extending from ground over the lower contacts of relay 804, over the contacts of relay 808, the upper back contact of relay 811, through the winding of magnet 809 to battery and ground over the lower back contact of relay 806. The brush shaft of the finder is thereby lifted one step placing the commutator brush 812 on the first vertical segment of the vertical commutator 803. The vertical off-normal springs 813 are now operated to their alternate positions and the circuit of relay 808 is opened at the interrupter contacts of magnet 809. Relay 808 now releases in turn releasing magnet 809 which in turn recloses the circuit of relay 808. Relay 808 reoperates and causes the reoperation of magnet 809. In this manner, magnet 809 is repeatedly operated and released to advance the brush shaft upwardly step by step until the commutator brush 812 engages the grounded segment 802 whereupon a circuit is established from ground on such segment from the upper contacts of relay 801L, over brush 812, through the lower winding of relay 811, over the interrupter contacts of the rotary magnet 810, through the lower winding of relay 808 to battery and ground over the lower back contact of relay 806. Relay 808 is thus held operated to prevent further stepping, magnet 809 remains released, and relay 811, which is slow to operate, operates after an interval sufficient to permit the switch brushes to cease vibrating following the completion of the last vertical stepping movement before they are started in their rotary stepping movement.

When relay 811 operates, it locks in a circuit from battery over the lower back contact of relay 806, through the winding of magnet 809 (which will not operate when relay 811 is in series therewith) through the upper winding and over the inner upper front contact of relay 811, to ground over the lower contacts of relay 804; opens at its lower inner back contact the circuit extending over the lower contacts of off-normal springs 813, through the winding of release magnet 814; and transfers the stepping circuit control of stepping relay 808 from the vertical magnet 809 to the rotary magnet 810. With the stepping relay 808 now operated, the circuit of the rotary magnet 810 may be traced from ground over the lower contacts of relay 804, the contacts of relay 808, the upper outer front contact of relay 811, through the winding of magnet 810 to battery and ground. Magnet 810, upon operating, advances the brush sets of the finder one step in a rotary direction and opens at its interrupter contacts the holding circuit of relay 808 previously traced and the operating circuit thereof extending from ground over the lower contacts of relay 804, interrupter contacts of magnet 809, interrupter contacts of magnet 810 and the lower winding of relay 808 to battery over the lower back contact of relay 806, whereupon relay 808 releases in turn releasing magnet 810. Magnet 810, upon releasing, reestablishes the circuit of relay 808 and relay 808, upon reoperating, reestablishes the circuit of magnet 810 to advance the brush sets another step in the rotary direction. In this manner the brush sets are advanced step by step until the test brush 815 encounters the test terminal 816 of the selected trunk.

When the brush sets have been stepped vertically to a position opposite the level wherein the selected trunk appears, and have been advanced in a rotary direction until test brush 815 encounters test terminal 816, a circuit will be established from battery applied through the winding of relay 207 of the trunk over conductor 208 to the test terminal 816, thence over test brush 815 through the lower winding of relay 817, the upper outer back contact of relay 806 and through the upper winding of relay 808 to ground on conductor 807. Relay 808 is held operated over this circuit to prevent further rotary stepping of the switch shaft and relay 817 operates sufficiently to close its inner upper contacts thereby establishing a circuit from battery through its upper winding over such contacts, the lower front contact of rotary magnet 810, contacts of relay 808, to ground over the lower contacts of relay 804. Both of its windings being now energized, relay 817 fully operates to extend control conductors 209, 210, 211 and 212 of the trunk over brushes 818, 819 and 820, respectively, of the trunk finder (brush 820 becomes a common brush for leads 211 and 212) and the upper Nos. 5, 4 and 3 armatures and front contacts of relay 817 to conductors 821, 822 and 823 which, as will be explained later, extend to identifier circuits; to cause the operation of relay 806 in a circuit extending from ground over the off-normal springs 813, the lower contacts of relay 817, through the lower winding of relay 806 to battery and ground; to open at its lower back contact another point in the circuit of release magnet 814 and to prepare a locking circuit for itself over its upper inner front contact which will be effective following the operation of relay 806.

Relay 806, upon operating, extends trunk conductor 208 over terminal 816 and brush 815, the upper No. 2 armature and front contact of relay 817 and the upper outer front contact of relay 806 to conductor 807 extending to the identifier circuits; completes the locking circuit of relay 817 extending from battery through the upper winding and upper No. 1 armature and front contact of relay 817, over the middle upper front contact of relay 806, to ground on conductor 807; transfers at its inner upper contact the in-start conductor 805 from the winding of start relay 804 to the out-start conductor 824 and through its upper winding to battery; at its lower back contact removes battery from the windings of relays 808 and 811 and from the vertical magnet 809; and at its upper outer front contact shunts the upper winding of relay 808. Relays 808 and 811 now release and relay 804, being slow to release, releases after an interval sufficient to allow ground to be applied to conductor 807 at the identifier to hold relay 817 and relay 207 of the trunk operated.

When relay 811 releases the continuity of the out-start conductor 824 is established at its lower outer normal contacts whereby if a second trunk in the same group should be in a calling condition, ground placed on the in-start conductor 805 will be effective to start the second trunk finder of the same group of finders if it is idle over a circuit extending from conductor 805, over the inner upper front contact of relay 806, lower outer normal contacts of relay 811, conductor 824, over the upper inner normal contacts of relay 806′ to the start relay of such second finder corresponding to relay 804. If such second finder is busy then relay 806′ would be operated and the out-start conductor 824 would be extended to and over the upper inner normal contact of relay 806″ to the start relay of a third finder, etc. Release of relays 811 and 808 opens the operating circuit for rotary stepping magnet 810 which remains released. It will be assumed that no other trunk in the group corresponding to group start relay 801L is in a calling condition so that relay 801L will release when ground is removed from conductor 206 by operation of the selections beyond relay 205 of the trunk.

It is assumed, as will be explained later, that an identifier is associated with leads 807, 821, 822 and 823 of the trunk finder before relay 804 releases, in which case, the identifier will supply an off-normal ground to lead 807 which will provide locking ground for relay 817, relay 806 being provided with locking ground over the lower front contact of relay 817 and over the upper inner back contact of relay 804 (when released) via the off-normal springs 813.

When the functions of the identifier will have been completed, and same releases, ground will have been removed from the conductor 807 thereby releasing relay 817 of the trunk finder 800 and relay 207 of the trunk. When relay 817 will have been released, a circuit will be established for release magnet 814 extending from battery through the winding of magnet 814, over the lower contacts of off-normal switch 813, over the lower inner back contact of relay 811, the lower back contact of relay 817, the upper inner back contact of relay 804 to ground over the upper contacts of off-normal switch 813. When trunk finder 800 will have been fully restored to normal, the contacts of switch 813 will open thereby releasing the magnet 814.

When relay 204 of the trunk operated it completed a circuit for operating slow-to-release relay 213 from battery, through the winding of relay 213, over the upper middle front contact of relay 204 to ground over the upper back contact of relay 214. Relay 213, upon operating, extends ground at its lower front contact to one side of the winding of relay 214 over the upper inner front contact of relay 204; but, relay 214 does not operate at this time since the other side of its winding is shunted to ground over the upper back contact of relay 205, conductors 201, 128, 134 and 409 over the upper front contact of relay 404.

*Identifier selection and seizure*

There is a group of identifier preference and busy relays for each trunk finder: preference relays 620, 621 and 622 and busy relays 620B, 621B and 622B for conductor 822 from trunk finder 800; preference relays 625, 626 and 627 and busy relays 625B, 626B and 627B for lead 623 from some other trunk finder; and preference relays 628, 629 and 630 and busy relays 628B, etc. for lead 624 from a third trunk finder, etc.

Figure 3:
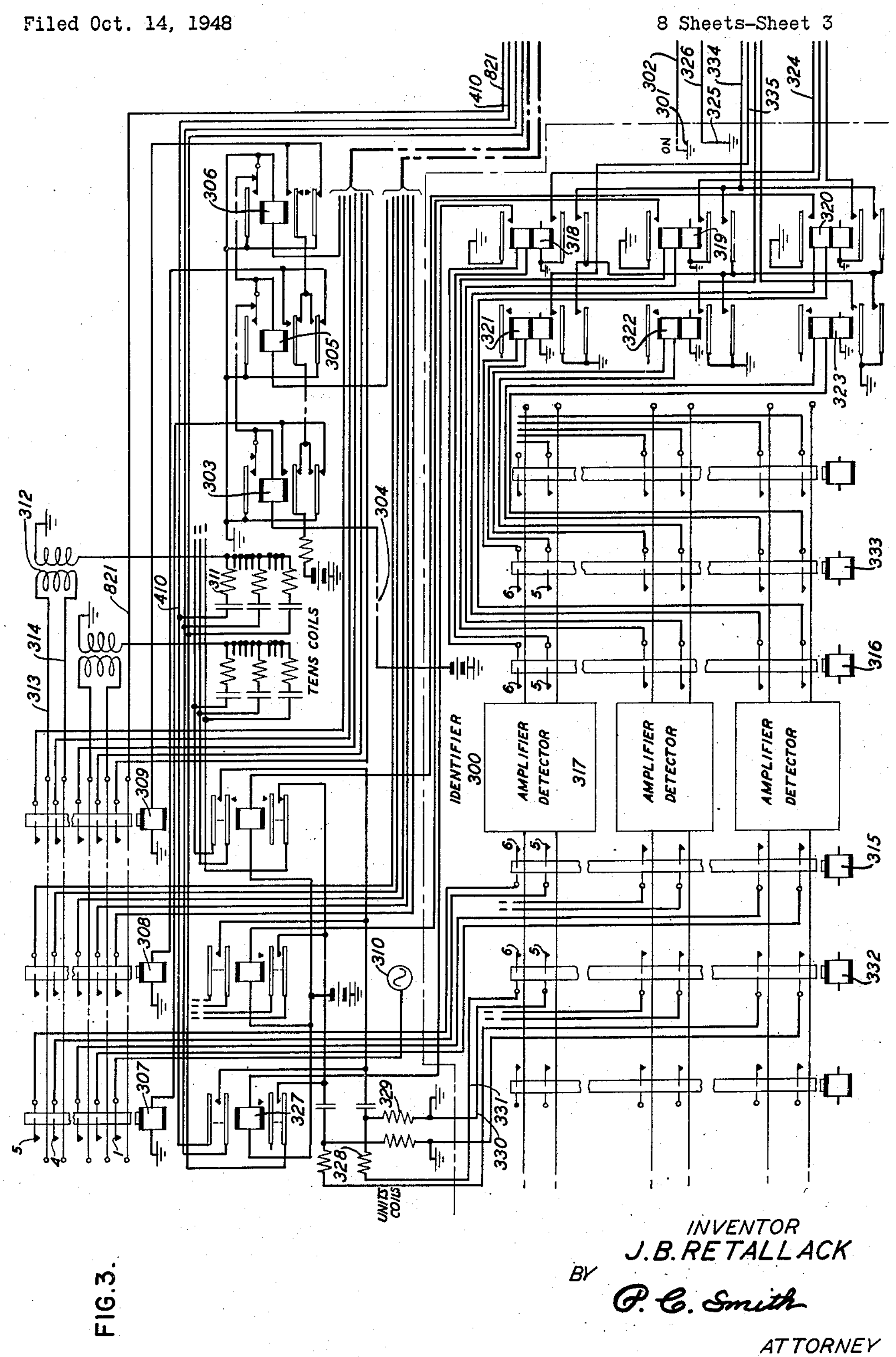
Fig. 3 shows a third identifier in sufficient detail for the purposes of the present invention and certain control and connector circuits common to these identifiers.
Figure 4:
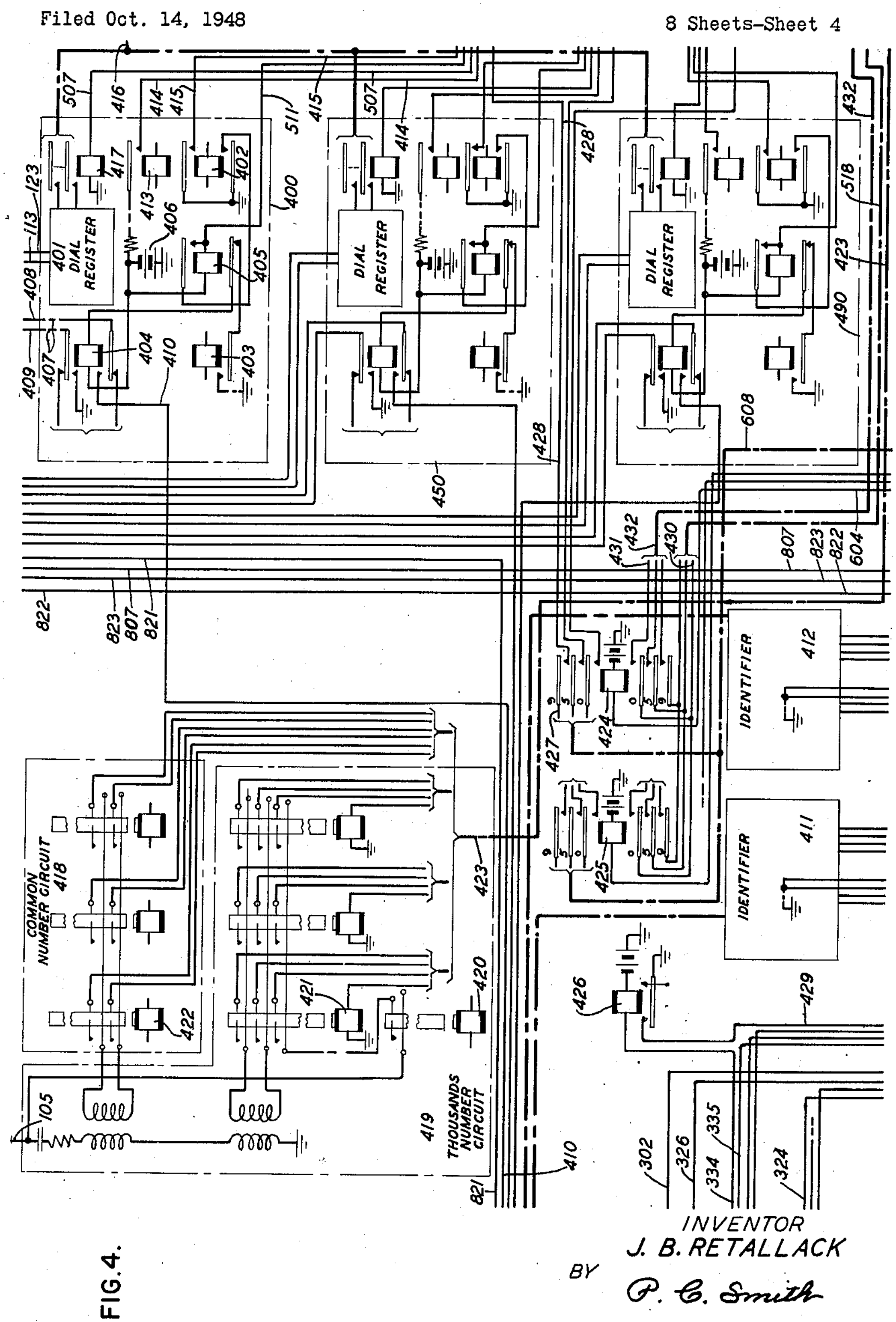
Fig. 4 shows a group of senders, to any one of which a calling subscriber's line may have access, and two of three identifiers representative of a group of such equipment.

In Fig. 4 are shown two identifiers 411 and 412 and in Fig. 3, a third identifier 300, in some detail. Identifier connector relays 600, 650 and 690 are associated with identifier 300 and can connect said identifier to any of the printer control circuits 700, 750 and 790 of Fig. 7, depending on which trunk finder is employed in the selection of an idle identifier. Likewise, connector relays 601, 651 and 691 are associated with identifier 411. Similarly, connector relays 602, 652 and 692 pertain to identifier 412. Each horizontal row of connector relays, such as 600, 601 and 602 are associated with a particular printer control circuit, such as 700.

When the trunk leads 209 to 212, inclusive, were extended to leads 821 to 823, inclusive (lead 823 being common to trunk leads 211 and 212) over the terminals of trunk finder 800 and over the contacts of relay 817, battery at the lower outer back contact of relay 214 was extended to lead 822 over the lower front contact of relay 204, lead 210, brush 819 of trunk finder 800, the upper No. 4 front contact of relay 817 to lead 822. Battery on lead 822 is extended over the upper back contact of identifier busy relay 620B to ground through the winding of identifier preference relay 620. Relay 620 operates in this circuit, provided busy relay 620B is not operated. Whenever an identifier, say 300, is busy each of its busy relays such as 620B, 625B and 628B, will be operated except that one on the horizontal level corresponding to the control circuit connected to the identifier in use. Therefore, if relay 620B is not operated, when lead 822 extends ground to the preference chain, this means that identifier 300 is idle and since it is first preference for lead 822, as wired, it will be selected as described hereinafter. Relay 620 locks to ground over its lower front contact and at its normal contacts opens the operating circuits of relays 625, 628, etc. so that these preference relays cannot be operated while relay 620 is operated. Relay 620, upon operating, completes over its upper front contacts an operating path for connector relay 600 as follows; ground, through the winding of connector relay 600, over the upper front contact of relay 620, the upper back contacts of all other preference relays corresponding to identifier 300, such as 625 and 628, to battery and ground. Connector relay 600 operates in this circuit to extend control leads from identifier 300 to printer control circuit 700 and to trunk 200 over trunk finder 800.

Reference is made to the above-mentioned Gooderham patent for a detailed description of identifiers, such as 300, and their operation in identifying calling line numbers and such as trunk or sender numbers, etc. Only sufficient description of such an identifier and its operation is supplied hereinafter as is necessary to an understanding of the present invention.

*Operation of sender and trunk select magnets and printer control hold magnet*

Upon the operation of connector relay 600 to seize identifier 300 for use, off-normal ground 301 in identifier 300 is extended over lead 302, horizontal 603 and operated contacts of connector relay 600, lead 807, the upper middle front contact of relay 806 and upper No. 1 front contact of relay 817 to battery and ground through the upper winding of relay 817 to hold same operated. Grounded lead 807 is also extended over the upper outer front contact of relay 806, the upper No. 2 front contact of relay 817, brush 815 and terminal 816 of trunk finder 800, lead 208 to battery and ground through the winding of relay 207 to hold same operated.

Pursuant to the seizure of identifier 300 the circuit of preference relay 303 is completed at 304. The preference relays 303, 305 and 306, etc., may correspond respectively to identifiers 300, 411 and 412 and are arranged such that each identifier has a prescribed order of preference for seizure and operation of connector relays 307, 308 and 309 for passage of sender identification tone from the source 310 thereof, over the sender and trunk circuits for identification of the sender used for the connection. As arranged, the identifier corresponding to preference relay 306 has first preference of the connector circuit, relay 305 next and 303 last. It is seen by inspection that operation of any one of the preference relays will prevent operation of all other connector relays except the associated one until the operated preference relay releases. The circuit for relay 303 extends from battery over connector 304, through the winding of relay 303, to ground over the upper normal contacts of all other preference relays in the chain. Relay 303, upon operating, completes the circuit for connector relay 307 from battery over the lower inner front contact of relay 303, to ground through the winding of connector relay 307. Relay 307, upon operating completes a circuit for sender identifier tone 310 as follows: lower No. 1 operated contact of relay 307, lead 821, the upper No. 5 operated contacts of relay 817, brush 818 of trunk finder 800, lead 209, the lower inner back contact of relay 205, trunk ring conductor 202, district ring conductor 137, contacts 140 and 141 and cam 142 of the sequence switch, conductor 143, connections through the sender link 102, conductor 408, over the lower contact of relay 404, conductor 410, through tens resistance and condenser assembly 311, to ground through the primary winding of transformer 312. The tone 310 is induced into the secondary winding of transformer 312, appearing on leads 313 and 314 extended over the Nos. 5 and 4 contacts of connector relay 307. At or about this time, as fully described in the above Gooderham application, connector relays 315 and 316 operate to extend the tone 310 over contacts Nos. 5 and 6 of connector relay 315, through detector 317, contacts Nos. 5 and 6 of connector relay 316 through the upper winding of tens register relay 318, which operates over the latter circuit.

Tens register relay 318 registers the tens digit, say 9, of the number of the sender 400 (assuming that the equipment numbers of the senders to be considered are two-digit numbers ranging from 00 to 99 for 100 senders). The other tens register relays, such as 319 and 320, are arranged to register other tens digits of said senders, say 5 and 0 respectively. When sender identification requires a two-digit identification, units register relays, such as 321, 322 and 323, provide such additional information as the units digit.

Operation of a tens register relay, say relay 318 representing tens digit 9, operates a tens connector relay 424 which completes operating paths for the select and hold magnets on the sender-printer control link switch, say 501, whereon senders having the tens digits 9 terminate. No hold or select magnets on other link switches will have completed operating circuits because the other tens connector relays, such as 425 for 0 tens digit senders, will not be operated. In effect, then, operation of a tens register relay, such as 318, selects and enables only the magnets associated with the link switching having senders terminating thereon which have the tens digit of their identifying number corresponding to the register value of the tens register relay operated.

Contacts of all of the units register relays, such as relay 321, are multiplied to armatures of all of the tens connector relays, such as 424 and 425. Therefore operation of a particular units register relay, say 321 having a register value of say 9, will operate the select magnet on the sender-printer control link switch corresponding to the sender terminating thereon having the units identifying digit of 9. Thus if tens connector relay 424 is operated to energize the magnet levels to only the link switch having sender numbers with tens digits 9) the operation of any units register relay will operate the corresponding units digit sender on that switch only. Likewise the hold magnet operating paths are completed only for those hold magnets associated with the link switch corresponding to the operated tens connector relay.

The operation of relay 318 completes a circuit for tens connector relay 424 from ground, over the lower inner front contact of relay 318, conductor 324, the No. 13 contact and horizontal of connector relay 600, conductor 604, to battery and ground through the winding of tens connector relay 424, which relay operates over the latter circuit.

Upon the operation of relay 318, a circuit is completed for the units connector relay 327 from ground over the upper front contact of relay 318, to battery and ground through the winding of relay 327. Relay 327, upon operating, extends the sender tone lead 410 over the upper outer front contacts of relay 327 to ground through the units assemblies 328 and 329. From the latter assemblies 328 and 329 a tone is derived from leads 330 and 331. Prior to this point, as described in the Gooderham application, connector relays 315 and 316 released, leaving tens register relay 318 locked operated by means of its lower winding, and connector relay 332 and 333 were operated. Tone leads 330 and 331 are thereby extended over contacts Nos. 5 and 6 of connector relay 332, detector 317, contacts Nos. 5 and 6 of connector relay 333, through the upper winding of units register relay 321. Relay 321, in operating, locks by means of its lower winding and completes the operating circuit for select magnet 540. The latter circuit extends from ground, over the lower inner front contact of relay 321, over lead 335, contacts and horizontal 606 of connector relay 600, lead 607, cable 608, lead 427, upper outer armature and front contact of tens connector relay 424, lead 428 to battery and ground through the winding of select magnet 540 corresponding to sender 400. Select magnet 540 operates over the latter circuit to prepare the sender-printer control link switch 501 for extending control conductors from sender 400 to the selected control circuit when a suitable hold magnet is operated.

Pursuant to sender identification, the ground connection 325 in identifier 300 is completed for operating trunk select magnet 520 on the trunk printer control link switch 502 over the circuit extending from ground at 325, over conductor 326, No. 11 contact and horizontal of connector relay 600, conductor 823, upper No. 3 operated contacts of relay 817, brush 820 of trunk finder 800, to conductors 211 and 212, over conductor 211 to battery and ground through the winding of trunk select magnet 520, which operates to prepare the trunk printer control link switch 502 for extending control conductors from trunk 200 to the selected control circuit when a suitable hold magnet is operated.

Relay 321, in operating, locks by means of its lower winding and completes the operating circuit for slow-operating relay 426. The circuit extends from ground, over the lower outer front contact of relay 321, the lower outer armature and front contact of relay 318, conductor 334, to battery and ground through the winding of relay 426. Relay 426, upon operating, completes at its front contact the operating circuits for hold magnets 570S and 570T on the sender and trunk link switches 501 and 502 corresponding to control circuit 700. Relay 426 is made slow operating to insure that the select magnets 540 and 520 have had an opoprtunity to operate before hold magnets 570S and 570T are operated. The circuits for the hold magnets extend from ground, over the front contact of relay 426, over conductor 429, No. 1 contact and horizontal of connector relay 600, lead 605, and over two circuits (1) lead 701, cable 518, lead 430, inner lower armature and front contact of tens connector relay 424, lead 431, cable 432, lead 519; to battery and ground through the winding of hold magnet 570S and (2) lead 702, normal contacts of relay 704, lead 730, to battery and ground through the winding of hold magnet 570T. Hold magnets 570S and 570T operate over the latter two circuits, completing the cross-point connections on the link switches 501 and 502 to extend control conductors thereover.

*Release of identifier*

When ground was placed upon lead 326 at identifier 300 following sender identification for the purpose of operating select magnet 520 on the trunk printer control link switch 502 over leads 823 and 211, such ground was also extended over lead 212 to battery and ground through the winding of selections beyond relay 205. It may be necessary, depending upon the time consumed in operation of the select and hold magnets on the printer control links 501 and 502, to make relay 205 sufficiently slow operating to insure that the identifier 300 has completed its task before relay 205 operates, because operation of relay 205 effects release of identifier 300, as will now be described.

Relay 205, upon operating over the above circuit, locks in a circuit extending from ground over the lower front contact of relay 213, lower middle front contact of relay 205 to battery and ground through the winding of relay 205. At its upper and lower inner front contacts relay 205 switches the tip conductor 201 and ring conductor 202 of trunk 200 to the upper and lower inner armature of cut-through relay 215, thence over the upper and lower inner back contacts of relay 215 out over the outgoing trunk 216 on a direct-current path to permit the calling sender equipment 400 to control switching machinery at the remote office for connecting to and calling of the called subscriber's station.

Relay 205, in operating, also opens at its lower outer contacts the operating circuit for group start relay 801L of trunk finder 800. Relay 801L releases, unless there is another trunk of the group associated therewith which has grounded the start lead 206, thereby removing ground potential from segment 802 of vertical commutator 803.

When relay 205 operated, thereby removing the grounded tip conductor 201 from the winding of relay 214, the relay 214 operates in series with relay 204 over the upper inner front contact of relay 204 to ground over the lower front contact of relay 213. Relay 214, in operating, switches the operating ground for relay 213 from the upper back contact of relay 214 over the upper front contact of relay 214 to the grounded sleeve conductor 203 over the upper back contact of sleeve relay 217. Relay 214, upon operating, applies ground to the winding of sleeve relay 217 over the lower inner front contact of relay 214 but sleeve relay 217 cannot operate because its winding is shunted by the grounded sleeve conductor 203.

Finally, relay 214, upon operating, removes battery from conductor 210 at its lower outer contacts. Battery is therefore removed from lead 822 and relay 620 releases. Relay 620, in releasing, releases connector relay 600. Relay 600, in releasing, releases busy relays 625B and 628B. The release of connector relay 600 releases identifier 300 which returns to normal thereby releasing all of its relays which were operated when relay 600 released. In particular, off-normal ground is removed from leads 302 and 807 to release relays 817 of trunk finder 800 and relay 207 of the trunk. Also ground 325 in identifier 300 is released to thereby release trunk select magnet 520 and to remove ground from the operating circuit of relay 205. In addition the tens connector relay 424 is released by the opening of lead 604 at connector relay 600 to thereby release sender select magnet 540. The release of select magnets 540 and 520, as is well known, leaves the hold magnets 570S and 570T in control of the cross-point connections previously established on the link switches and permits other senders and trunks to connect to idle printer control circuits without double connection trouble. Hold magnets 570S and 570T are held operated, when identifier 300 releases, by ground over the upper front contact of off-normal relay 402, lead 415 and vertical 504 of sender link switch 501, front contact of hold magnet 570S, leads 701 and 702, normal contacts of relay 704 and lead 730.

*Release of trunk finder*

Upon removal of off-normal ground from lead 302 at identifier 300, such ground was removed from lead 807 to trunk finder 800 to release relay 817 as previously described. With 817 released, a circuit is established for release magnet 814 extending from battery through the winding of such magnet, over the lower contacts of off-normal switch 813, over the inner lower back contact of relay 811, the lower back contact of relay 817, the upper inner back contact of relay 804 to ground over the upper contacts of off-normal switch 813. When trunk finder 800 is fully restored to normal, the contacts of switch 813 open thereby releasing magnet 814. With switch 813 open the locking circuit through the lower winding of relay 806 is opened to thereby permit relay 806 to release, thus fully releasing all circuits and equipment of trunk finder 800 to normal whereupon such finder may be utilized by another trunk.

*Registering the called number*

When all of the called number digits, both office code and numericals, have been registered in dial register 401, the dialing complete relay 413 of the sender is operated. Relay 413, in operating, completes a circuit for operating a sender preference relay from battery and ground over the front contact of relay 413, conductor 414, vertical 503 of sender link switch 501, winding of sender preference relay 510, normal contacts of the other preference relays in the chain, such as relays 515 and 519, to ground. Relay 510 operates over the latter circuit and in so operating accomplishes at least two functions of interest at present. A circuit is completed for operating a sender connector relay 510C from ground and battery 505, over the lower inner front contact of relay 510, through the winding of connector relay 510C to ground. Sender connector relay 510C operates in the latter circuit thereby extending sufficient conductors, represented by cable 416, from sender 400 to printer control circuit 700 whereby the called number registered in dial register 401 may be transmitted to the called number register 706 of the control circuit 700. Relay 417 of sender 400 is operated over a circuit extending from ground and battery 505, over the upper middle front contact of relay 510, vertical 506 of the sender link switch 501, conductor 507 and to ground through the winding of relay 417. Relay 417, in operating, connects cable 416 to various register relays of dial register 401 of sender 400. Sender 400 then proceeds in well-known fashion to transfer the called number registrations to the called number register 706 of control circuit 700 over front contacts of relay 417, cable 416, front contacts of connector relay 510C, cable 508 to register 706 over back contacts of relay 760. Relay 405 of sender 400 is operated in a circuit extending from ground on vertical 509 of sender link switch 501, lead 511 to battery 406 and ground through the winding of relay 405. Relay 405, in operating, locks to ground over the lower front contact of off-normal relay 402 and over the upper front contact of relay 405 and opens at its lower back contact the operating circuit of relay 404 which thereupon releases.

When all of the called number digits have been transferred to the register 706 from sender register 401 the sender release relay 704 is operated. Relay 760, operates in an obvious circuit in parallel with relay 704 and locks to off-normal ground in the control circuit. Relay 760, in operating, opens the leads in cable 508 from the sender connector thereby preventing interference due to an attempted reuse of the trunk finder in a subsequent call before the release of printer control circuit 700. Relay 704, in operating, opens at its normal contacts the connection between conductors 702 and 703 and places ground on conductor 703 over its front contact. The operation of relay 704 signals sender 400 to release its off-normal relay 402. Relay 402, in releasing, removes ground from the circuit of hold magnet 570S, which thereupon releases, hold magnet 570T remaining operated over the ground supplied to lead 703 over the front contact of relay 704.

With the release of the sender, off-normal relay 402 and hold magnet 570S all of the sender relays release to return sender 400 to an idle condition and sender connector preference relay 510 and connector relay 510C release.

*Cut-through of district*

Sender 400, prior to the above release, and in response to the registration in dial register 401 of the called number performed the necessary functions of selecting beyond over the outgoing trunk 216 as has been briefly discussed above. After having completed the task of controlling the remote selections, sender 400, prior to release, sends the district to cut-through condition after effecting the following switching operations, among others, over the contacts of the sequence switch: the connection is opened between contacts 109 and 110 by means of disc 111 and contact 109 is connected thereby to contact 152; the connection is opened between contacts 119 and 120 by means of disc 121 and contact 119 is connected thereby to contact 153; the connection is opened between contacts 131 and 132 by means of disc 133; and the connection is opened between contacts 140 and 141 by means of disc 142.

As a result of the above sequence switch operation under control of sender 400, the tip and ring conductors 103 and 104 of subscriber 100 are extended to the tip and ring conductors 201 and 202 respectively of trunk 200, over the upper and lower inner front contacts respectively of selections beyond relay 205, and to the outgoing trunk 216 over the upper and lower inner back contacts respectively of cut-through relay 215. Also the sender link 102 becomes disassociated with subscriber 100.

Sender 400 effects cut-through by controlling the sequence switch further to open the connection between ground on contact 150 and contact 149 by means of disc 151 and contact 149 is connected to contact 154 thereby, thus removing ground 150 from sleeve conductor 203 of trunk 200. Removal of ground from sleeve conductor 203 permits sleeve relay 217 to operate in series with the line relay 156 and holds line relay 155 operated in parallel with relay 156. Removal of ground from sleeve conductor 203 and the operation of sleeve relay 217 removes ground from the operating circuit of slow-releasing relay 213. However, relay 213 does not release immediately and, as will be understood, a new holding ground is provided to prevent such release. Cut-through relay 215 operates from sleeve ground over the front contact of sleeve relay 217. The operation of relay 215 extends the tip and ring conductors of subscriber 100 to conductors 218 and 219, respectively, over upper and lower inner front contacts of relay 215. Supervisory relay 220 operates in a circuit extending from ground, through the upper winding of relay 220, the upper back contact of reversing relay 221, conductor 222, lower left part of repeat coil 223, conductor 219, the lower inner front contacts of relays 215 and 205, over the tip ring loop of subscriber 100, upper inner front contacts of relays 205 and 215, conductor 218, upper left part of repeat coil 223, conductor 224, the lower inner back contact of relay 221, to battery and ground through the lower winding of relay 220. Relay 220, in operating, provides a holding path for relay 213 from ground over the lower front contact of relay 213, front contact of relay 220, to battery and ground through the winding of relay 213.

The operation of relay 215 also extends the upper right and lower right parts of repeat coil 223 to outgoing trunk 216 over conductors 225 and 226, respectively, in a circuit extending from conductor 227 of the outgoing trunk 216, over the upper outer front contact of relay 215, conductor 225, upper right part of repeat coil 223, winding of supervisory relay 228, lower right part of repeat coil 223, conductor 226, lower No. 2 armature and front contact of relay 215 to conductor 229 of the outgoing trunk 216. The polarity of voltage on the outgoing trunk loop is opposed to that required to operate polar supervisory relay 228. When the called subscriber answers, however, as will be explained later, the polarity of said loop voltage is reversed, as is well known, to operate relay 228.

At its lower No. 3 armature and front contact, relay 215, upon operating, prepares a circuit for the operation of relay 230 when reversing relay 221 is operated pursuant to answer of the call by the called party.

*Identification of calling line number and its registration*

In Fig. 7 is shown a block 707 labeled "Identifiers" which is to be understood to represent a group of identifiers, an idle one of which may be seized for an identification function. Such apparatus is fully disclosed and described in the above Gooderham application.

When relay 215 operated to cut through the trunk 200, potential (ground in this instance) was applied to conductor 231, over vertical 512 of link switch 502, lead 513, over the back contact of relay 708, lead 703 to a preference relay chain to seize one of the group 707 of identifiers. Upon seizure of an idle identifier a tone is transmitted therefrom over lead 709, vertical 514 of link switch 502, lead 516, sleeve conductor 203, through and over the sleeve leads of the panel switching machinery, over sleeve lead 105 of the line circuit of calling line subscriber 100, to the "common number circuit" 418 and "thousands number circuit" 419, etc. for identification, by means of operation of relay connectors 420, 421 and 422, etc. of the calling line number.

Number circuits 418 and 419, etc. are common to a group of identifiers, such as 707, and transmit to registers in the identifier being employed the information concerning the number of the calling line. Such information may be transmitted to the identifier over leads represented by cable 423, over leads 710 and 711 to calling number register 712 of control circuit 700. The transmission of this information is followed by a check signal sent to the control circuit 700 from the identifier to the effect that the identifier has transmitted the desired information and that such has been registered in calling line register 712. This signal comprises the operation of relay 708 by application at the identifier of ground to lead 713. When the control circuit 700 has received all of the necessary information from the identifier such as the above-described calling line number and other information such as perhaps class of service, identifier number, charge rate, etc., and when relay 708 has operated and locked over its own front contact to ground over the left front contact of relay 704, the identifier start lead 703 is opened at the back contacts of relay 708. Opening of the start lead 703 releases the identifier of group 707 which was seized by lead 703 for calling line identification. The release of the identifier effects the release of the operated relays in the number circuits 418 and 419.

*Résumé*

The printer control circuit 700, at this time, has recorded or registered therein all of the information desired to be recorded on a toll ticket except for the month, day and hour of the call and the elapsed time of the ticketed conversation. The sender, trunk finder and identifier circuits have completed their functions and the printer control circuit 700 is connected to trunk 200 by means of trunk link switch 502. The printer control circuit 700 is now ready to transmit its registered information to the ticket printer 232 of trunk 200 for starting the printing of the toll ticket for the call effected by subscriber 100.

A printer control progress switch 714 controls (as fully described by Gooderham above), step by step, the transmission of such information to the ticket printer 232, at the conclusion of which transmissions, relay 704 of the printer control circuit is released to thereby release relay 708 and the printer control trunk link 502 with all associated apparatus, leaving the trunk 200 to record the elapsed time of conversation in call timer 233 and to cause such elapsed time to be printed on the ticket by the ticket printer 232 at the conclusion of the conversation.

*Printing the called and calling numbers and month, day and hour*

When the printer control circuit 700 is ready to initiate printing of the toll ticket, battery 715 is connected to lead 716, over lead 716, through the winding of trunk preference relay 539 to ground over the normal contacts of all other preference relays, such as 535 and 530. Relay 539 operates in this circuit and, in operating, accomplishes at least two functions. It operates trunk connector relay 539C over a circuit from battery 521, the lower inner front contact of connector relay 539, through the winding of connector relay 539C and to ground. Relay 539, in operating, also completes the operating circuit for relay 234 from battery 521, over the upper middle front contact of relay 539, lead 522, vertical 523 of link switch 502, lead 524, to ground through the winding of relay 234.

The called number is transmitted to ticket printer 232 from the called number register 706 of the control circuit 700 over groups 717 and 718 of leads, operated contacts of connector relay 539C, group 517 of leads, front contacts of relay 234 to ticket printer 232. The called number is transmitted over the above path under control of progress switch 714 by means of group 719 of leads extending to said switch 714 from register 706.

The calling number is transmitted to ticket printer 232 from the calling number register 712 of control circuit 700 over groups 720 and 718 of leads, operated contacts of connector relay 539C, group 517 of leads, front contacts of relay 234 to ticket printer 232. The calling number is transmitted over the above path under control of progress switch 714 by means of group 721 of leads extending to said switch 714 from register 712.

The month, day and hour circuit 722 is associated with printer control circuit 700 and its progress switch 714 by means of control leads 723 and the progress switch 714 effects the transmission of the month, the day and the hour of the call to the ticket printer 232 over connector leads (not shown) similar to those from registers 706 and 712 of control circuit 700.

The ticket printer 232 prints all of the foregoing information on a toll ticket as it is transmitted thereto and at the completion of all such transmission relay 704 of printer control circuit 700 is released. The release of relay 704 removes ground at its right front contact from lead 703 thus permitting hold magnet 570T to release. Release of relay 704 also opens, at its left front contact, the holding circuit for relay 708 which thereupon releases. Hold magnet 570T, in releasing, returns printer control circuit 700 to normal along with the month, day and hour circuit 722. Release of printer control circuit 700 opens battery connection 715 to thereby release trunk preference relay 539 and connector relay 539C to completely restore the trunk link to normal. Release of printer control circuit 700 also releases relay 760 to again close the leads of cable 508. Release of hold magnet 570T opens the circuit for relay 234 which thereupon releases to disconnect ticket printer 232 from the group 517 of leads from the trunk connector relays.

*Résumé*

The trunk 200 is the only major piece of apparatus remaining connected to the subscriber 100 and the ticket printer has printed all of the necessary information on the toll ticket except the duration of the call. The latter information is provided at the conclusion of the call under control of trunk 200 as will be described hereinafter.

*Answer by called party*

When the called party answers by lifting his receiver from its normal position he effects a reversal of polarity of voltage over the outgoing trunk loop to thereby operate polar relay 228 over a circuit including the upper and lower right-hand portions of repeat coil 223, as previously traced. Relay 228, on operating, completes at its front contact an operating circuit for reversing relay 221 from ground, over the front contact of relay 228, through the winding of relay 221 to battery and ground. Relay 221, on operating, reverses the leads 222 and 224 connected to the two windings of supervisory relay 220 which continues to remain operated under the control of the calling subscriber. Relay 221, in operating, completes a circuit for operating relay 230 from battery, through the lower winding of relay 230, over the lower No. 3 armature and front contact of relay 215, the lower outer front contact of relay 221, the normal contacts of relay 230 to ground supplied to lead 235 from the timing interrupter of the miscellaneous interrupter frame. Relay 230, on operating, locks to ground over its lower front contact, said ground replacing the ground on lead 235 removed therefrom when the normal contacts of relay 230 are opened. After a measured time interval, such as two seconds, after the operation of relay 230, the interrupter frame supplies ground to lead 236, over the upper outer front contact of relay 230, normal contacts of the charging relay 237, through the winding of relay 237 to battery and ground. Relay 237 operates over the latter circuit and locks in a circuit from battery and the winding of relay 237, over the upper inner front contact of relay 237, the lower inner back contact of no-ticketing relay 238, to ground over the upper front contact of relay 213.

As soon as relay 237 operates and as soon thereafter as the timer 239 applies ground to the winding of the timer relay 240, a circuit is completed every fifteen seconds at the upper outer front contacts of relay 240. The latter circuit extends from ground, over the upper outer front contact of relay 240, the lower front contact of relay 237, the lower outer back contact of relay 238, to the upper inner and middle armatures of relay 230, thence over the upper inner front contact of relay 230 and through the upper winding of relay 230, to insure its remaining locked, and over the upper middle front contact of relay 230 to call duration timer 233. Thus every fifteen seconds the call duration timer 233 receives a ground signal from the timer 239 to record in the timer 233 the duration of the conversation to the closest full fifteen seconds of conversation time.

*Calling subscriber hangs up first*

If at the completion of the conversation, the calling subscriber 100 hangs up first, the operating circuit of supervisory relay 220 is opened by a break in the tip ring loop of the subscriber's line. Relay 220, in releasing, opens at its front contacts the locking circuit of relay 213. Release of relay 213 opens at its upper front contact the holding circuit for the charge relay 237 and at its lower front contact opens the holding circuits for relays 205, 214 and 204. Relays 237, 205, 214 and 204 release. Relay 214, in releasing, removes ground at its lower inner front contact from the operating circuit of the sleeve relay 217 and all line relays (such as 155 and 156) of Fig. 1. Relay 217 and line relays 155 and 156 release. Relay 217, upon releasing, opens at its front contact the operating path of relay 215 which releases thus opening at its lower No. 3 armature and front contact the operating and holding circuit for relay 230. Relay 230, in releasing, opens at its upper outer front contact the operating path for relay 237 which remains released.

The release of relays 237 and 230 stops the accumulation of elapsed time registration in call duration timer 233, which then becomes associated with ticket printer 232 to cause the latter to print the total elapsed time of conversation on the toll ticket to complete the toll ticketing operation.

When the called subscriber hangs up his receiver the supervisory relay 228 will release, opening the operating circuit of relay 221 which thereupon releases to complete the return of trunk 200 to normal.

The release of line relays 155 and 156 cause the release to normal of the switching machinery in the calling office including the sequence switch.

*Called subscriber hangs up first*

If the called subscriber hangs up first his supervisory relay 228 will release due to a reversal of polarity of the loop voltage on the outgoing trunk. The release of relay 228 opens at its front contact the operating path of relay 221 which, in releasing, opens at its lower outer front contact the operating and holding circuit of relay 230. Relay 230 releases to open at its upper middle front contact the timing impulse circuit to the call duration timer 233 to thereby stop the recording of elapsed conversation time.

The remaining apparatus in trunk 200 and Fig. 1 releases to normal as soon as the calling subscriber 100 hangs up his receiver as was described above.

*Non-ticketed calls*

If, for any reason, such as a calling subscriber class of service for which no toll ticket is needed on a particular type of outgoing trunk call, no ticket is to be printed, relay 238 of trunk 200 will be operated as an incident to identification of the calling line number, class of service, etc. When relay 238 is operated the path from timer 239 to call duration timer 233 is opened at the lower inner back contact of relay 238 so that zero elapsed time will be recorded for billing purposes. Actually, in such a case, it probably would be more economical from an equipment use standpoint to take cognizance of the no-ticketing situation early enough to eliminate unnecessary operation by an identifier and by printer control links. However, upon properly ticketed calls, these apparatus are necessary as has been described previously. Relay 238, in operating, locks through its upper winding, over its upper front contact, to ground over the upper outer front contact of charge relay 237. Relay 238, in operating, also transfers the locking circuit of relay 237 to ground over the lower inner front contact of relay 238.

Although the present invention is disclosed by way of example as embodied in a panel type automatic telephone system, the invention will be readily understood to be embodied in other telephone systems and the disclosure herein is in no way to be construed as limiting the scope of said invention. The appended claims alone define the scope of said invention.

What is claimed is:

1. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of printer control circuits, means for connecting an idle one of said circuits with said sender and with said selected trunk, registering means in said control circuit, means responsive to the connection of said control circuit with said sender for transferring the registrations from the registering means of said sender to the registering means of said control circuit, and means responsive to the connection of said control circuit with said trunk for controlling the ticket printer of said trunk in accordance with the setting of the registering means of said circuit.

2. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of printer control circuits, means for connecting an idle one of said control circuits with said selected trunk, a plurality of identifiers, means responsive to the connection of said control circuit with said trunk for associating an idle one of said identifiers with said control circuit, means in said identifier for registering the digits of the calling line number, registering means in said control circuit, and means responsive to the association of said identifier with said control circuit for transferring the registrations from the registering means of said identifier to the registering means of said control circuit.

3. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of printer control circuits, means for connecting an idle one of said circuits with said selected trunk, a plurality of identifiers, means responsive to the connection of said control circuit with said trunk for associating an idle one of said identifiers with said control circuit, means in said identifier for registering the digits of the calling line number, registering means in said control circuit, means responsive to the association of said identifier with said control circuit for transferring the registrations from the registering means of said identifier to the registering means of said control circuit, and means responsive to the connection of said control circuit with said trunk for controlling the ticket printer of said trunk in accordance with the setting of the registering means of said circuit.

4. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of printer control circuits, means for connecting an idle one of said circuits with said sender and with said selected trunk, registering means in said control circuit, means responsive to the connection of said control circuit with said sender for transferring the registrations from the registering means of said sender to the registering means of said control circuit, a plurality of identifiers, means responsive to the connection of said control circuit with said trunk for associating an idle one of said identifiers with said control circuit, means in said identifier for registering the digits of the calling line number, and means responsive to the association of said identifier with said control circuit for transferring the registrations from the registering means of said identifier to the registering means of said control circuit.

5. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of printer control circuits, means for connecting an idle one of said circuits with said sender and with said selected trunk, registering means in said control circuit, means responsive to the connection of said control circuit with said sender for transferring the registrations from the registering means of said sender to the registering means of said control circuit, a plurality of identifiers, means responsive to the connection of said control circuit with said trunk for associating an idle one of said identifiers with said control circuit, means in said identifier for registering the digits of the calling line number, means responsive to the association of said identifier with said control circuit for transferring the registrations from the registering means of said identifier to the registering means of said control circuit, and means responsive to the connection of said control circuit with said trunk for controlling the ticket printer of said trunk in accordance with the setting of the registering means of said circuit.

6. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of printer control circuits, means for connecting an idle one of said circuits with said sender and with said selected trunk, first registering means in said control circuit, means responsive to the connection of said control circuit with said sender for transferring the registrations from the registering means of said sender to the first registering means of said control circuit, a plurality of identifiers, means responsive to the connection of said control circuit with said trunk for associating an idle one of said identifiers with said control circuit, means in said identifier for registering the digits of the calling line number, second registering means in said control circuit, means responsive to the association of said identifier with said control circuit for transferring the registrations from the registering means of said identifier to the second registering means of said control circuit, and means responsive to the connection of said control circuit with said trunk for controlling the ticket printer of said trunk in accordance with the settings of both registering means of said circuit.

7. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of identifiers, means responsive to the seizure of a trunk for seizing an idle identifier, means in said identifier for identifying the sender used on the connection, a plurality of printer control circuits, means controlled by said identifier for connecting an idle one of said circuits with said identified sender, registering means in said control circuit, and means responsive to the connection of said control circuit with said sender for transferring the registrations from the registering means of said sender to the registering means of said control circuit.

8. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of identifiers, means responsive to the seizure of a trunk for seizing an idle identifier, means in said identifier for identifying the sender used on the connection, a plurality of printer control circuits, means controlled by said identifier for connecting an idle one of said circuits with said identified sender and with said selected trunk, registering means in said control circuit, means responsive to the connection of said control circuit with said sender for transferring the registrations from the registering means of said sender to the registering means of said control circuit, and means responsive to the connection of said control circuit with said trunk for controlling the ticket printer of said trunk in accordance with the setting of the registering means of said circuit.

9. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of identifiers, means responsive to the seizure of a trunk for seizing an idle one of said identifiers, a plurality of printer control circuits, means controlled by an identifier when seized for connecting an idle one of said circuits with said selected trunk, means responsive to the connection of said control circuit with said trunk for associating an idle one of said identifiers with said control circuit, means in said latter identifier for registering the digits of the calling line number, registering means in said control circuit, and means responsive to the association of said latter identifier with said control circuit for transferring the registrations from the registering means of said latter identifier to the registering means of said control circuit.

10. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of identifiers, means responsive to the seizure of a trunk for seizing an idle one of said identifiers, a plurality of printer control circuits, means controlled by said identifier for connecting an idle one of said circuits with said selected trunk, means responsive to the connection of said control circuit with said trunk for associating an idle one of said identifiers with said control circuit, means in said latter identifier for registering the digits of the calling line number, registering means in said control circuit, means responsive to the association of said latter identifier with said control circuit for transferring the registrations from the registering means of said latter identifier to the registering means of said control circuit, and means responsive to the connection of said control circuit with said trunk for controlling the ticket printer of said trunk in accordance with the setting of the registering means of said circuit.

11. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of identifiers, means responsive to the seizure of a trunk for seizing an idle one of said identifiers, means in said identifier for identifying the sender used on the connection, a plurality of printer control circuits, means controlled by said identifier for connecting an idle one of said circuits with said identified sender and with said selected trunk, registering means in said control circuit, means responsive to the connection of said control circuit with said sender for transferring the registrations from the registering means of said sender to the registering means of said control circuit, means responsive to the connection of said control circuit with said trunk for associating an idle one of said identifiers with said control circuit, means in said latter identifier for registering the digits of the calling line number, and means responsive to the association of said latter identifier with said control circuit for transferring the registrations from the registering means of said latter identifier to the registering means of said control circuit.

12. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digits of a wanted line number, means controlled in accordance with the registered office code digits for controlling said switching apparatus for extending a connection from said line to an idle one of said trunks, a plurality of identifiers, means responsive to the seizure of a trunk for seizing an idle one of said identifiers, means in said identifier for identifying the sender used on the connection, a plurality of printer control circuits, means controlled by said identifier for connecting an idle one of said circuits with said identified sender and with said selected trunk, registering means in said control circuit, means responsive to the connection of said control circuit with said sender for transferring the registrations from the registering means of said sender to the registering means of said control circuit, means responsive to the connection of said control circuit with said trunk for associating an idle one of said identifiers with said control circuit, means in said latter identifier for registering the digits of the calling line number, means responsive to the association of said latter identifier with said control circuit for transferring the registrations from the registering means of said latter identifier to the registering means of said control circuit, and means responsive to the connection of said control circuit with said trunk for controlling the ticket printer of said trunk in accordance with the setting of the registering means of said circuit.

13. In an automatic ticketing system, a calling line, a plurality of trunks each having a ticket printer individual thereto, switching apparatus, a plurality of senders, means for associating an idle one of said senders with said calling line upon the initiation of a call on said line, means in said sender for registering the office code and numerical digit of a wanted line number, means controlled in accordance with the registered office code digits for controlling said switching apparatus for extending a connection from said line to an idle one of said trunks, a plurality of identifiers, means responsive to the seizure of a trunk for seizing an idle one of said identifiers, means in said identifier for identifying the sender used on the connection, a plurality of printer control circuits, means controlled by said identifier for connecting an idle one of said circuits with said identified sender and with said selected trunk, first registering means in said control circuit, means responsive to the connection of said control circuit with said sender for transferring the registrations from the registering means of said sender to the first registering means of said control circuit, means responsive to the connection of said control circuit with said trunk for associating an idle one of said identifiers with said control circuit, means in said latter identifier for registering the digits of the calling line number, second registering means in said control circuit, means responsive to the association of said latter identifier with said control circuit for transferring the registrations from the registering means of said latter identifier to the second registering means of said control circuit, and means responsive to the connection of said control circuit with said trunk for controlling the ticket printer of said trunk in accordance with the settings of both registering means in said circuit.

JOHN B. RETALLACK.

References Cited in the file of this patent

UNITED STATES PATENTS

| Number | Name | Date |
|---|---|---|
| 2,297,365 | Ostline | Sept. 29, 1942 |
| 2,352,492 | Ostline | June 27, 1944 |
| 2,369,868 | Taylor et al. | Feb. 20, 1945 |
| 2,373,908 | Ostline | Apr. 17, 1945 |
| 2,447,533 | Retallack | Aug. 24, 1948 |
| 2,500,374 | Ostline | Mar. 14, 1950 |
| 2,535,510 | Ostline | Dec. 26, 1950 |